No. 658,094. Patented Sept. 18, 1900.
C. M. PALMER.
ANIMAL SHEARING MACHINE.
(Application filed Sept. 6, 1898.)
(No Model.)
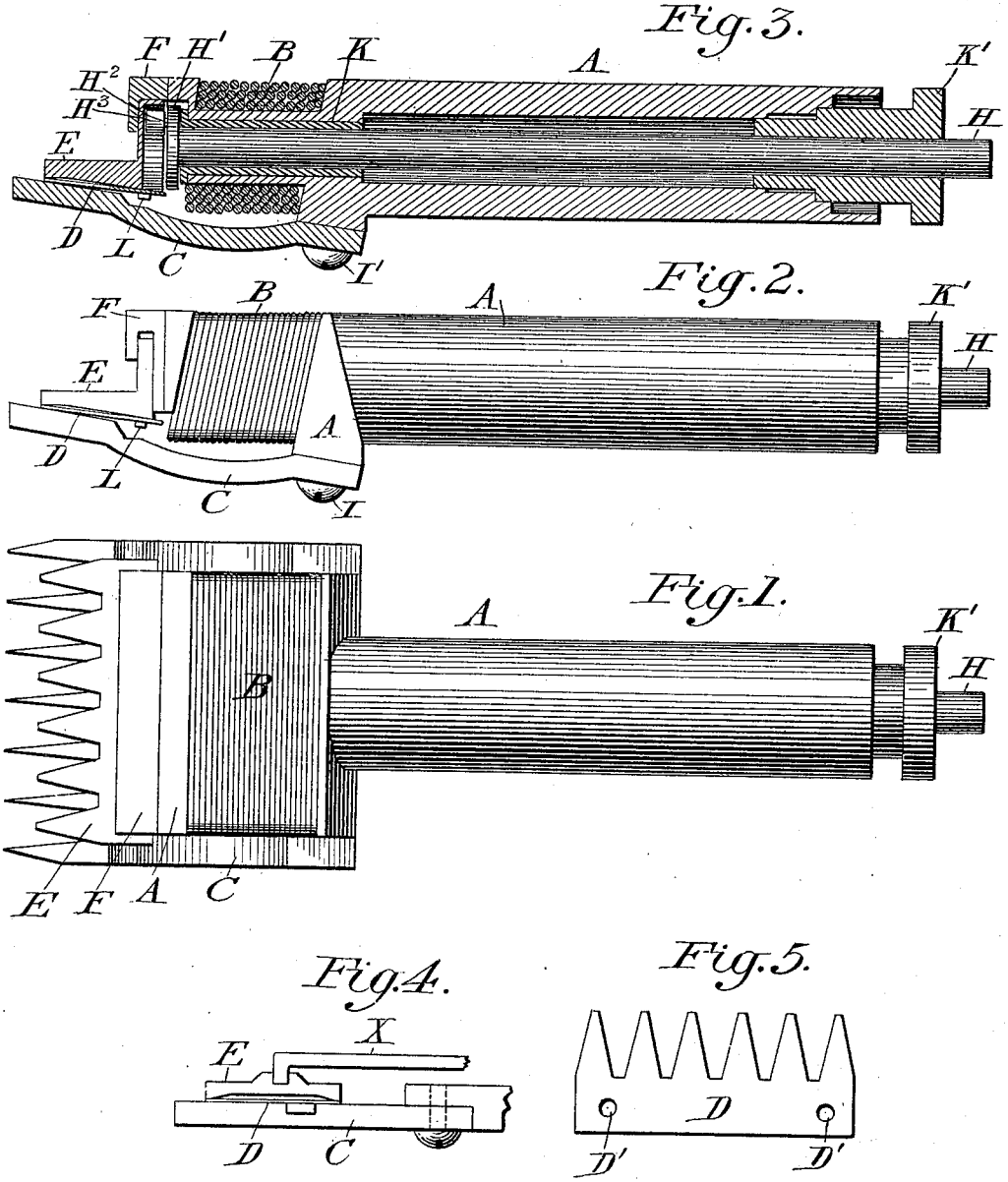
Witnesses:
H. H. Johnson
Sidney Willyard
Inventor:
Chester M. Palmer

UNITED STATES PATENT OFFICE.

CHESTER M. PALMER, OF FOND DU LAC, WISCONSIN.

ANIMAL-SHEARING MACHINE.

SPECIFICATION forming part of Letters Patent No. 658,094, dated September 18, 1900.

Application filed September 6, 1898. Serial No. 690,279. (No model.)

*To all whom it may concern:*

Be it known that I, CHESTER M. PALMER, a citizen of the United States, residing at Fond du Lac, in the county of Fond du Lac and State of Wisconsin, have invented a new and useful Improvement in Animal-Shearing Machines, of which the following is a specification.

My invention relates to improvements in the cutting devices of that class of hand or power operated animal-shearing machines having a movable cutter that is adapted to vibrate or reciprocate across the teeth of a fixed guard; and the objects of my invention are, first, to provide a cutting device composed of a fixed guard and a flexible cutter having teeth or segments and a furcated cutter-holder the fingers of which correspond to the teeth or segments of the cutter and the base of which is formed at a pitch to the teeth of the guard and adapted to bear upon and conform to the teeth or segments of the cutter to the shear pitch desired; second, to provide a tension device that acts upon the cutter-holder for the proper adjustment of the cutting devices to a cutting contact, and, third, to provide an operating mechanism whereby when in operation the movable cutter is reciprocated across the teeth of the fixed guard.

I attain these objects by the mechanism illustrated in the accompanying drawings, in which—

Figure 1 is a top view of the machine. Fig. 2 is a side elevation, and Fig. 3 is a central sectional view. Fig. 4 is a side view of a modified form of a portion of a machine. Fig. 5 is a plan view of the knife.

In carrying out my improvement of the cutting devices in the preferred form I apply it more particularly to that class of animal-shearing machines in which the cutting devices are magnetically held in cutting contact and in which my improvement consists of substantially the form of the frame A, Figs. 1, 2, and 3, on which is wound a helix or coil B to magnetize the cutting device, a comb or guard C, firmly attached by the screws I and I', and a pole-piece F, firmly attached by means of screws, a shaft H, journaled concentrically with the frame A and coil B, that connects with and reciprocates the movable cutter D by means of a cam or crank-pin H', on which is a roller H², that connects with and operates the holder E, which carries the said cutter D when the shaft H is rotated. The holder E, Figs. 1, 2, and 3, is of an angle-bar form, and the part that forms the base is of a furcated form, the fingers of which correspond to the teeth in the cutter D, and the base of which is of a concave form and formed at a pitch to the teeth of the guard C and adapted to bear upon and conform to the teeth of the cutter D to a shear pitch in advance of or in progression with the cutting angle in correspondence to the magnetic tension applied through the said cutter-holder E, thus forming a combination in which the movable cutter has a yielding shear pitch in advance of or in progression with the cutting angle, which is a new principle in this class of cutting devices, and, together with the modes of carrying the same into effect, forms this part of my invention.

The guard C is provided with teeth at the forward end, and the rear end has two slots (not shown) into which the screws I and I' engage to attach it to the frame A. The surface of the toothed and slotted portion are in the same plane and the central portion is of a concavo-convex form to provide clearance for the coil B.

The cutter D is a thin sheet of steel having teeth corresponding to the teeth in the guard and is detachably connected to the base of the holder E by means of the pins L, which are firmly adjusted in the holder E and extend through the holes D' in the cutter D.

In operation the machine is held in the hand of the operator, the terminals of the coil B are connected with an electric-current supply, the cutting devices being inductively magnetized thereby, and the holder E is strongly attracted against the pole-piece F and cutter D to the teeth of the guard C. The shaft H is rotated by any desirable means, and the cutter D is thereby reciprocated across the teeth of the guard C, the teeth of the cutter D being conformed to a shear pitch by the holder E in progression with the cutting angle.

In a modified form of carrying my improvement of the cutting devices into effect, as shown in Fig. 4, A is a portion of a frame to which the guard C is attached. The base of the holder E is of a concave form and bears upon and conforms the cutter D to a shear pitch when tension is applied to the holder E through the vibrator X by means of any desirable mechanism.

From the preceding specification it will be readily understood that I do not confine myself to any particular form of tension device or operating mechanism in carrying my improvement of the cutting devices into effect; but What I do claim, and desire to secure by Letters Patent, is—

1. In an animal-shearing machine, the combination with a frame, a fixed comb or guard, and operating mechanism, of a furcated cutter-holder the base of the forks formed at a pitch to the plane of the face of the teeth of said guard, a flexible cutter having teeth corresponding to the forks of said holder, and means of detachably securing said cutter upon the base of said holder, and a tension device, whereby said cutter is held or conformed to a shear pitch, substantially as set forth.

2. In an animal-shearing machine, the combination with a frame A, of a fixed comb or guard C, a furcated cutter-holder E, a flexible cutter D, means for securing said cutter upon the base of said holder, a shaft H journaled in the frame A, the pin H′, and roller H², and the coil B upon the frame A, and a source of electric current in circuit with said coil B, all substantially as and for the purpose as set forth.

CHESTER M. PALMER.

In presence of—
CHAS. E. ATKINS,
LEO G. KORRER.